United States Patent Office 2,991,200
Patented July 4, 1961

2,991,200
REFRACTORY COATING COMPOSITION AND METHOD OF COATING SURFACES THEREWITH
William R. Sheridan, Buffalo, and John F. Young and Donald L. Kurtis, Niagara Falls, N.Y., assignors to the United States of America as represented by the Secretary of the Air Force
No Drawing. Filed Nov. 27, 1957, Ser. No. 699,429
4 Claims. (Cl. 117—169)

The present invention relates to coating of metal and other surfaces and as illustrated herein relates more particularly to coating metal or other surfaces by using a mixture of sodium silicate and zirconium oxide.

One object of the present invention is to provide an adhesive coating for surfaces which are subjected to high temperatures and violent temperature changes.

Another object of the invention is to provide an improved refractory coating which will extend the useful life of rocket thrust chambers by providing adherent heat insulating resistant coatings therefor.

The above-mentioned objects can be realized by combining zirconium oxide powder and silicate of soda to form a paste of a consistency suitable for brushing and applying the paste to the surface which it is desired to protect and then subsequently drying the paste.

The preferred formula comprises 2 lbs. of zirconium oxide mixed with 1.42 lbs. of silicate of soda (RU Grade). RU Grade is a standard designation for silicate of soda which comprises 13.8% $Na_2O$, 33.2% $SiO_2$, and the balance being water. This formula produces a consistency suitable for brushing. The paste is applied to the surface of the device to be protected and dried for one hour at 45° C., one-half hour at 65° C. and for one and one-half hours at 125° C.

The dried or baked coating provides a thermal insulating barrier. It resists chemical attack of the hot gases. It resists erosion from the hot high velocity gases and also reduces thermal shock to the material of which the combustion chamber is formed. The coating may also be applied to other surfaces which require a thin heat resistant coating, such as the outer surfaces of supersonic missiles or aircraft.

The formula set forth above produces a coating of sufficient consistency for brushing and may further be thinned, if desired, with water for spray application to a surface. Modifications of the formula may be made within reasonable limits and the drying schedule may also be varied if so desired for producing substantially the same results.

The present coating may be applied to cooled and uncooled surfaces and has good adhesion to both ceramic and metal surfaces.

Having thus described our invention, what we claim as new and desire to secure by Letters Patent of the United States is:

1. A refractory composition for coating surfaces subjected to high temperatures consisting essentially of a mixture of zirconium oxide and RU Grade silicate of soda in substantially the proportion by weight of 58.5% and 41.5%, respectively.

2. A method of coating surfaces subjected to high temperatures, comprising coating said surfaces with a mixture consisting essentially of zirconium oxide and RU Grade silicate of soda in substantially the proportion by weight of 58.5% and 41.5%, respectively, and drying said coating at progressively increasing temperatures up to 125° C. for a period of approximately three hours.

3. A method of coating surfaces subjected to high temperatures, comprising coating said surfaces with a mixture consisting essentially of zirconium oxide and RU Grade silicate of soda in substantially the proportion by weight of 58.5% and 41.5%, respectively, and drying said coating at progressively increasing temperatures, ranging from 45° C. to 125° C. for a period of approximately three hours.

4. A method of coating surfaces subjected to high temperatures, comprising coating said surfaces with a mixture consisting essentially of zirconium oxide and RU Grade silicate of soda in substantially the proportion by weight of 58.5% and 41.5%, respectively, and drying said coating approximately one hour at 45° C., approximately one half hour at 65° C. and approximately one and one half hours at 125° C.

References Cited in the file of this patent
UNITED STATES PATENTS

| | | |
|---|---|---|
| 1,564,394 | Youngman | Dec. 8, 1925 |
| 1,816,006 | Easter | July 28, 1931 |
| 1,956,895 | Charman et al. | May 1, 1934 |
| 2,567,088 | Teasel | Sept. 4, 1951 |
| 2,666,975 | Govan | Jan. 26, 1954 |